United States Patent Office 3,552,833
Patented Jan. 5, 1971

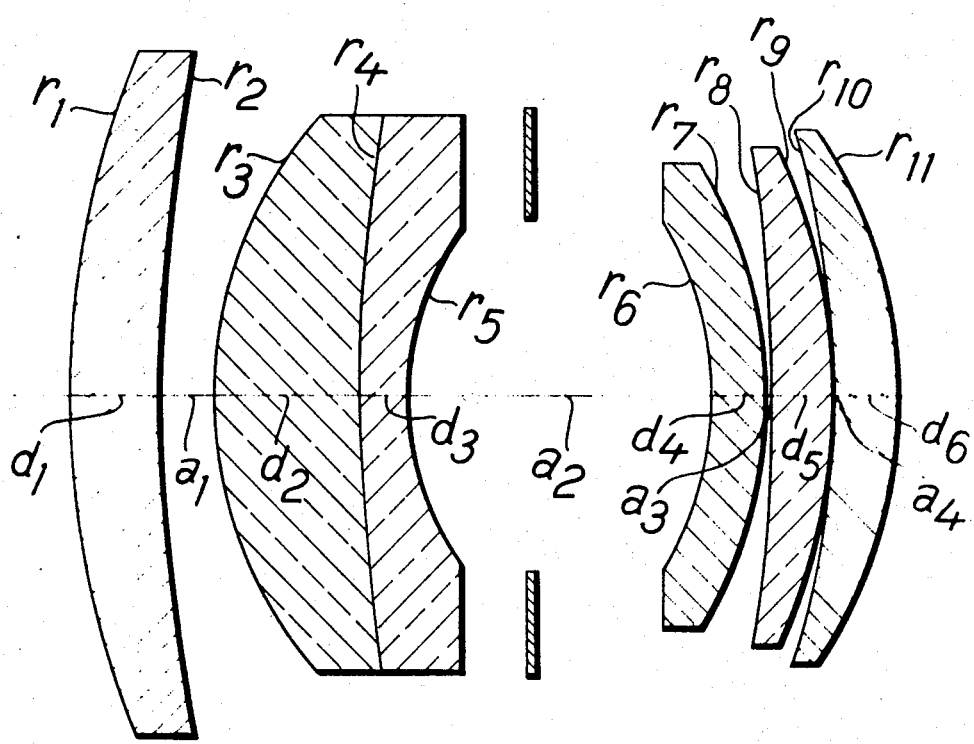

---

3,552,833
PHOTOGRAPHIC GAUSS TYPE OBJECTIVE
Heinz Marquardt, Wetzlar, Germany, assignor to Firma Ernst Leitz, G.m.b.H., Wetzlar, Germany
Filed Dec. 2, 1968, Ser. No. 780,428
Claims priority, application Germany, Dec. 30, 1967, 1,269,385
Int. Cl. G02b 9/60
U.S. Cl. 350—217    1 Claim

ABSTRACT OF THE DISCLOSURE

A photographic Gauss type objective is disclosed which comprises five meniscus lens members. In front of the objective diaphragm in the direction of light travel are aligned one singlet converging meniscus and one cemented negative meniscus. Behind the diaphragm are arranged three singlet meniscus lens members whereof the first one is negative while the remaining two are positive. The objective has a relative aperture of at least $f{:}2.8$, a field angle of $\pm 18°$, and it can be used in an image scale field ranging from $\infty{:}1$ to $1{:}1$.

BACKGROUND OF THE INVENTION

It is an object of the present invention to provide a photographic objective which can be used in an image scale field ranging from $\infty{:}1$ to $1{:}1$ and which represents an acceptable and even favorable compromise of image errors at all required image scales.

SUMMARY OF THE INVENTION

The above stated object is attained by constructing an objective, comprising one singlet positive meniscus and one cemented negative meniscus in front of the diaphragm and one singlet negative and two singlet positive meniscus lens members behind the diaphragm, according to the specifications set forth in the following table for which the focal length equals 1 and wherein:

$r_1$ to $r_{11}$ represents the radii of successive lens surfaces,
$d_1$ to $d_6$ represents the axial thickness of the respective lenses,
$a_1$ to $a_4$ represents the axial spacings between the respective lenses,
$n_e$ and $v_e$ represent respectively the refractive indices and Abbe numbers of the lens materials,
$\Delta n/r$ represents the refractive power of the respective lens surface, which data could also be written as $$\frac{n'-n}{r}$$

wherein $n'$ is the refractive index of the material behind the surface, $n$ is the refractive index of the material in front of the surface, and $r$ is the radius of the surface, and
$s'$ represents the back focal distance.

The table is to be read in connection with the drawing which represents a view of an objective incorporating the invention and cut along the optical axis.

| Radii | Thicknesses and spacings | $n_e$ | $v_e$ | $\Delta n/r$ |
|---|---|---|---|---|
| $r_1 = +0.6373$ | | | | $+1.173623$ |
| | $d_1 = 0.0600$ | 1.74795 | 44.5 | |
| $r_2 = +1.2995$ | | | | $-0.575567$ |
| | $a_1 = 0.0390$ | | | |
| $r_3 = +0.2895$ | | | | $+2.393160$ |
| | $d_2 = 0.1029$ | 1.69282 | 49.5 | |
| $r_4 = +1.1521$ | | | | $-0.013175$ |
| | $d_3 = 0.0339$ | 1.67764 | 32.0 | |
| $r_5 = +0.1928$ | | | | $-3.514730$ |
| | $a_2 = 0.2234$ | | | |
| $r_6 = -0.2020$ | | | | $-3.666831$ |
| | $d_4 = 0.0359$ | 1.74070 | 26.2 | |
| $r_7 = -0.2853$ | | | | $+2.596214$ |
| | $a_3 = 0.0028$ | | | |
| $r_8 = -1.1428$ | | | | $-0.545038$ |
| | $d_5 = 0.0432$ | 1.62287 | 60.1 | |
| $r_9 = -0.4434$ | | | | $+1.404758$ |
| | $a_4 = 0.0028$ | | | |
| $r_{10} = -0.5971$ | | | | $-1.030329$ |
| | $d_6 = 0.0440$ | 1.61521 | 58.4 | |
| $r_{11} = -0.3237$ | | | | $+1.900556$ |
| $s' = 0.6838$ | | | | |
| $\Sigma(d+a) = 0.5871$ | | | | |

Variations from the above thicknesses and spacings data can be tolerated if they do not exceed $\pm 10\%$. From the surface refractive powers $(\Delta n/r)$ variations can be permitted in a range of $\pm 20\%$. The latter variations may be attained by a change of the radii and/or by variations in the refractive index of the used glass types.

What is claimed is:

1. A photographic Gauss type objective having a relative aperture of at least $f{:}2.8$ and a field angle of $\pm 18°$, said objective comprising in the direction of light travel one singlet positive meniscus and one cemented negative meniscus in front of the diaphragm and one singlet negative and two singlet positive meniscus lens members behind said diaphragm, said lens members having substantially the following approximate specifications:

| Radii | Thicknesses and spacings | $n_e$ | $v_e$ | $\Delta n/r$ |
|---|---|---|---|---|
| $r_1 = +0.6373$ | | | | $+1.173623$ |
| | $d_1 = 0.0600$ | 1.74795 | 44.5 | |
| $r_2 = +1.2995$ | | | | $-0.575567$ |
| | $a_1 = 0.0390$ | | | |
| $r_3 = +0.2895$ | | | | $+2.393160$ |
| | $d_2 = 0.1029$ | 1.69282 | 49.5 | |
| $r_4 = +1.1521$ | | | | $-0.013175$ |
| | $d_3 = 0.0331$ | 1.67764 | 32.0 | |
| $r_5 = +0.1928$ | | | | $-3.514730$ |
| | $a_2 = 0.2234$ | | | |
| $r_6 = -0.2020$ | | | | $-3.666831$ |
| | $d_4 = 0.0359$ | 1.74070 | 26.2 | |
| $r_7 = -0.2853$ | | | | $+2.596214$ |
| | $a_3 = 0.0028$ | | | |
| $r_8 = -1.1428$ | | | | $-0.545038$ |
| | $d_5 = 0.0432$ | 1.62287 | 60.1 | |
| $r_9 = -0.4434$ | | | | $+1.404758$ |
| | $a_4 = 0.0028$ | | | |
| $r_{10} = -0.5971$ | | | | $-1.030329$ |
| | $d_6 = 0.0440$ | 1.61521 | 58.4 | |
| $r_{11} = -0.3237$ | | | | $+1.900556$ |
| $s' = 0.6838$ | | | | |
| $\Sigma(d+a) = 0.5871$ | | | | | wherein the data given for the thicknesses, spacings and radii are expressed in multiples of the focal length of the objective.

References Cited

UNITED STATES PATENTS 2,831,397    4/1958    Berger et al. _____ 350—216X

JOHN K. CORBIN, Primary Examiner